United States Patent [19]
Minet et al.

[11] Patent Number: 5,229,102
[45] Date of Patent: * Jul. 20, 1993

[54] CATALYTIC CERAMIC MEMBRANE STEAM-HYDROCARBON REFORMER

[75] Inventors: Ronald G. Minet, South Pasadena; Theodore T. Tsotsis, Huntington Beach, both of Calif.

[73] Assignee: Medalert, Inc., Irvine, Calif.

[*] Notice: The portion of the term of this patent subsequent to Jan. 1, 2008 has been disclaimed.

[21] Appl. No.: 634,576

[22] Filed: Dec. 27, 1990

Related U.S. Application Data

[63] Continuation-in-part of Ser. No. 434,267, Nov. 13, 1989, Pat. No. 4,981,676.

[51] Int. Cl.$^5$ .............. B01J 8/02; B01J 35/02; C01B 3/26
[52] U.S. Cl. ............... 423/652; 48/61; 123/3; 422/192; 422/202; 422/218; 422/239; 423/359; 423/653; 518/704
[58] Field of Search ........ 423/652, 653; 422/192, 422/202, 218, 239; 48/61; 123/3

[56] References Cited

U.S. PATENT DOCUMENTS

| | | | |
|---|---|---|---|
| 3,428,476 | 2/1969 | Langley et al. | 55/16 |
| 3,450,500 | 6/1969 | Setzer et al. | 55/16 |
| 4,713,234 | 12/1987 | Weirich et al. | 423/652 |
| 4,981,676 | 1/1991 | Minet et al. | 423/652 |

Primary Examiner—Wayne Langel
Attorney, Agent, or Firm—William W. Haefliger

[57] ABSTRACT

A diffusion process from steam reforming of a hydrocarbon to produce $H_2$, Co and $CO_2$, that includes: providing a generally tubular, porous, ceramic membrane, and providing a heated reaction zone in a container into which the membrane is received; the membrane carrying a catalytically active metallic substance; passing a hydrocarbon and steam containing first fluid stream into the zone and into contact with one side of the membrane, to produce CO, $CO_2$ and $H_2$; and passing a second fluid stream adjacent the opposite side of the membrane in such manner as to promote hydrogen diffusion through the membrane from said one side to said opposite side thereof; and removing hydrogen from the opposite side of the membrane. Such a process may be combined with operation of a heat engine or gas turbine, producing heat transferred to the referenced reaction zone.

20 Claims, 5 Drawing Sheets

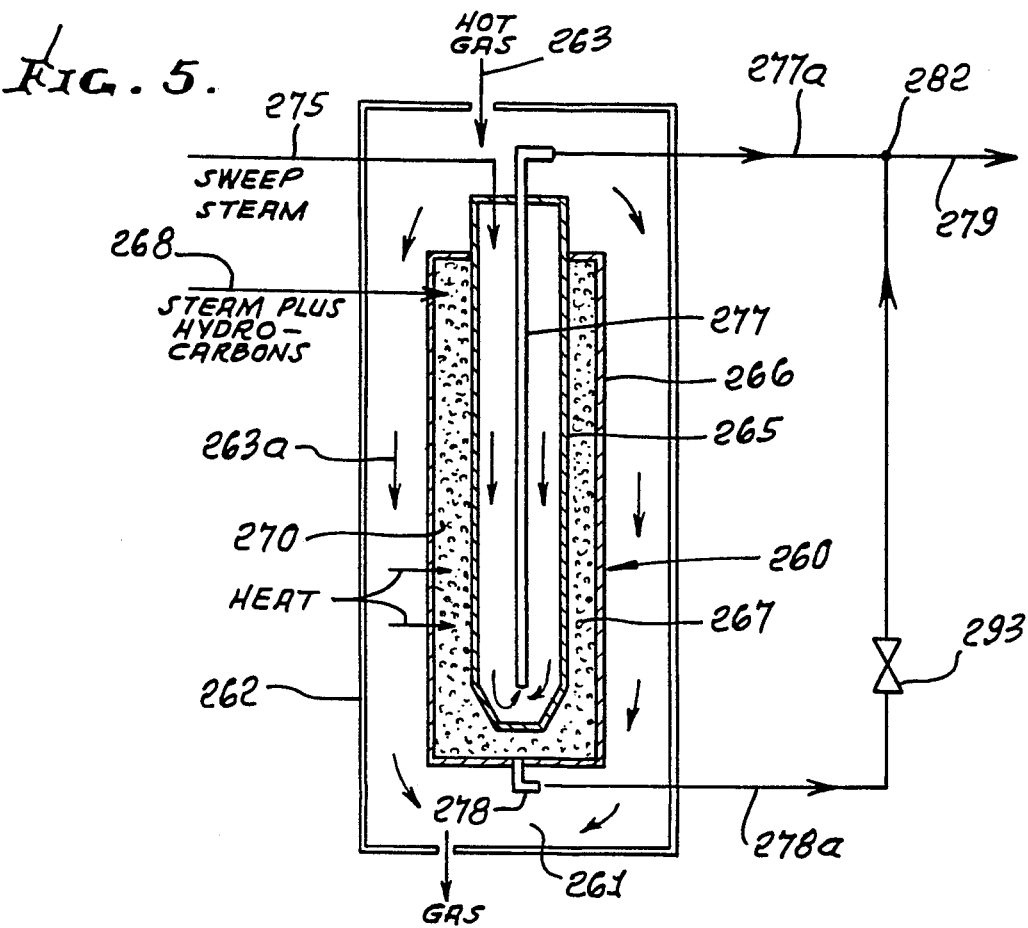
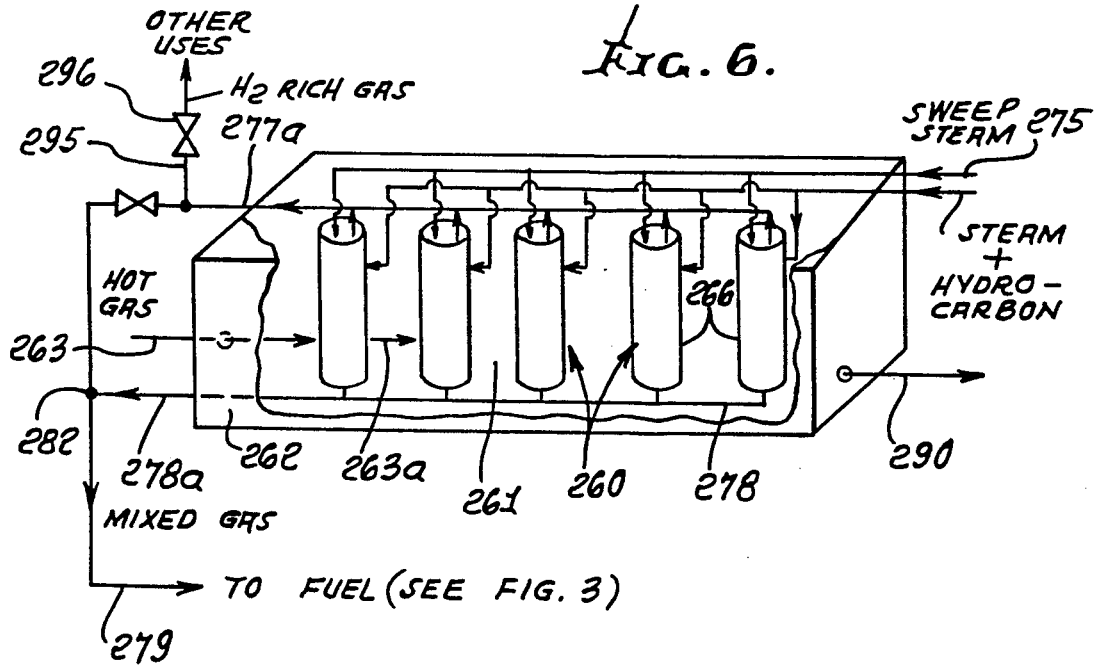

CATALYTIC CERAMIC MEMBRANE STEAM-HYDROCARBON REFORMER

BACKGROUND OF THE INVENTION

This application is a continuation-in-part of Ser. No.434,267, filed Nov. 13, 1989, U.S. Pat. No. 4,981,676.

This invention relates generally to steam reformation of hydrocarbon, and more particularly to process and apparatus employing a porous ceramic reactor tube or tubes to achieve economic advantages.

The commercial application of steam reforming of hydrocarbons for the production of hydrogen, ammonia, methanol, and other products involves the catalytic reaction of a hydrocarbon feedstock with steam to form a mixture of hydrogen, carbon monoxide, carbon dioxide, water vapor, and residual hydrocarbons.

The reaction between methane and steam to produce hydrogen as well as carbon monoxide and carbon dioxide is a well-known chemical process which proceeds in accordance with the following chemical equation:

$$CH_4 + H_2O \rightarrow CO + 3H_2 \quad (1)$$

$$CH_4 + 2H_2O \rightarrow CO_2 + 4H_2 \quad (2)$$

The water gas shift reaction is also involved as follows:

$$CO + H_2O \rightarrow CO_2 + H_2 \quad (3)$$

All of the foregoing reactions are favored by the presence of appropriate catalytic materials. In the case of equations (1) and (2), the normal catalyst is nickel deposited on alumina support materials.

Reactions (1) and (2) are endothermic and require the rapid input of heat at high temperatures to cause the reaction to take place at an economic rate. Typically, the steam methane reformer is a furnace with multiple high temperature alloy tubes filled with nickel-impregnated carrier material, pelleted catalyst. Temperatures in the range of 700° to 880° C. are required to cause the system to reach equilibrium conversion levels for methane in the range of 90+%. Some data giving typical equilibrium compositions of reformed methane as a function of the temperature are given in:

TABLE 1

NORMAL EQUILIBRIUM COMPOSITION FOR METHANE STEAM REFORMING LOWER TEMPERATURE RANGE VOLUME %

| Component | Temperature °C. | | | | | |
|---|---|---|---|---|---|---|
| | 350 | 403 | 463 | 524 | 584 | 664 |
| $CH_4$ | 16.9 | 16.1 | 14.7 | 12.8 | 10.4 | 6.7 |
| $CO_2$ | 0.9 | 1.5 | 2.5 | 3.7 | 5.1 | 6.3 |
| CO | — | — | — | 0.1 | 0.6 | 2.1 |
| $H_2$ | 3.6 | 6.1 | 10.2 | 15.7 | 22.2 | 31.6 |
| $H_2O$ | 78.5 | 76.3 | 72.6 | 67.7 | 61.7 | 53.3 |

Catalytic steam reformer furnaces are conventially generally were limited to pressures less than about 500 psi at design temperatures of about 1,750° F. (935° C.), and with a mechanical limitation of about one-inch thickness for cast, high alloy steel tubes. Such tubes were required to be long, i.e., about ten meters, in commercial installation. There is need for an improved process and apparatus, and particularly a process making it possible to operate at lower temperatures and possibly pressure, enabling "once through" operation for high pressure hydrogen requirements as in methanol and ammonia plants, as well as hydrocracking.

SUMMARY OF THE INVENTION

It is a major object of the invention to provide a process, and apparatus, meeting the above need, as well as permitting lower temperature reforming by hydrocarbons at high conversion levels. In particular, it is a major object to provide a significantly improved process, wherein a high temperature catalytic ceramic membrane is employed to permit the hydrogen generated by the reaction to permeate out of the reaction zone as it is formed allowing the conversion of methane (and other hydrocarbons) to hydrogen to proceed more than to 90+% even at low temperatures (of the order of 300° to 600° C.) This is in accordance with the standard equilibrium constant equations:

$$K_{P1} = \frac{[CO][H_2]^3}{[CH_4][H_2O]} \quad (4)$$

$$K_{P2} = \frac{[CO_2][H_2]^4}{[CH_4][H_2O]} \quad (5)$$

As the hydrogen is removed from the reaction zone, the equilibrium equation requires the conversion of more methane to satisfy the relationship. If all hydrogen produced is removed from the reaction zone, the equilibrium equation requires the conversion of more methane to satisfy the relationship If all hydrogen produced remains in the reaction zone, the equilibrium conversion level at 600° C. and 300 psig is only 27%; and at 650° C., it is only 36%.

If the hydrogen produced is permeated out of the reaction zone by an appropriate differential pressure across the catalytic membrane, the equilibrium equation will be satisfied by the conversion of methane until it is consumed.

Accordingly, it is another object of the invention to provide an improved process that employs the following steps:

a) providing a generally tubular, porous, ceramic membrane, and providing a heated reaction zone in a container into which the membrane is received, b) the membrane carrying a catalytically active metallic substance, c) passing a hydrocarbon and steam containing first fluid stream into the reaction zone and into contact with one side of the membrane, and to produce $CO_2$ and $H_2$, d) and passing a steam containing second fluid stream adjacent the opposite side of the membrane in such manner as to promote hydrogen diffusion through the membrane from said one side to said opposite side thereof, e) and removing hydrogen from the opposite side of the membrane.

As will later be seen, the reformed hydrogen is removed from the reaction zone, downstream and along the length of the ceramic tube, from the point of introduction of the hydrogen to that zone. Typically, the orientation relative to the ceramic tube is such that i) the first stream is introduced to the zone at a point A along the length of the membrane, ii) the second stream is introduced into a region surrounded by the membrane at a point B along the length of the membrane, iii) the hydrogen is removed from the region at a point C along the length of the membrane, iv) and the Co, Co₂ and H₂O are removed from the reaction zone at a point D along the length of the membrane.

In this regard, points C and D are spaced along the length of the ceramic tube from points A and B.

Banks of such tubes and metallic containers therefor, may be employed in a furnace, as will later be seen.

An additional object includes the provision of a process wherein the heat for the reaction zone is provided by the recovery of heat from the exhaust gases of a gas turbine or gas engine used for driving a compressor or an electric energy generator. As will be seen, the partially reformed hydrocarbon and steam from one side of the membrane may be combined with the hydrogen and steam from the other side of the membrane, with the resulting mixture of partially reformed hydrocarbon, hydrogen and steam being subsequently consumed as fuel giving low nitrogen oxide emissions by virtue of the lower adiabatic flame temperature made possible by the presence of steam and the superior combustion characteristics of the hydrogen rich fuel gas. Also the catalytic ceramic membrane steam/hydrocarbon reformer can be used to recover thermal energy from the exhaust gases of the gas turbine (or the gas engine) in the form of chemical energy, i.e. as hydrogen and carbon monoxide, which gases can subsequently be combusted with the fuel gas for the gas turbine or gas engine to provide incremental improvement (approximately 5%) in overall energy utilization. Flame temperature may be kept below 3000° to minimize nitrogen oxide formation, and to reduce nitrogen oxide emission to atmosphere. A heat exchanger may receive hot products of combustion from said means for burning said fuel gas, and for passing one of the following:

steam process fluid in heat receiving communication with said hot products of combustion.

These and other objects and advantages of the invention, as well as the details of an illustrative embodiment, will be more fully understood from the following specification and drawings, in which:

DRAWING DESCRIPTION

FIG. 1 is an elevation showing one form of apparatus performing the process; and FIG. 2 is an elevation showing a furnace employing multiple such devices as are shown in FIG. 1, together with associated process steps; and FIGS. 3-7 are process flow diagrams.

DETAILED DESCRIPTION

Figure 1:
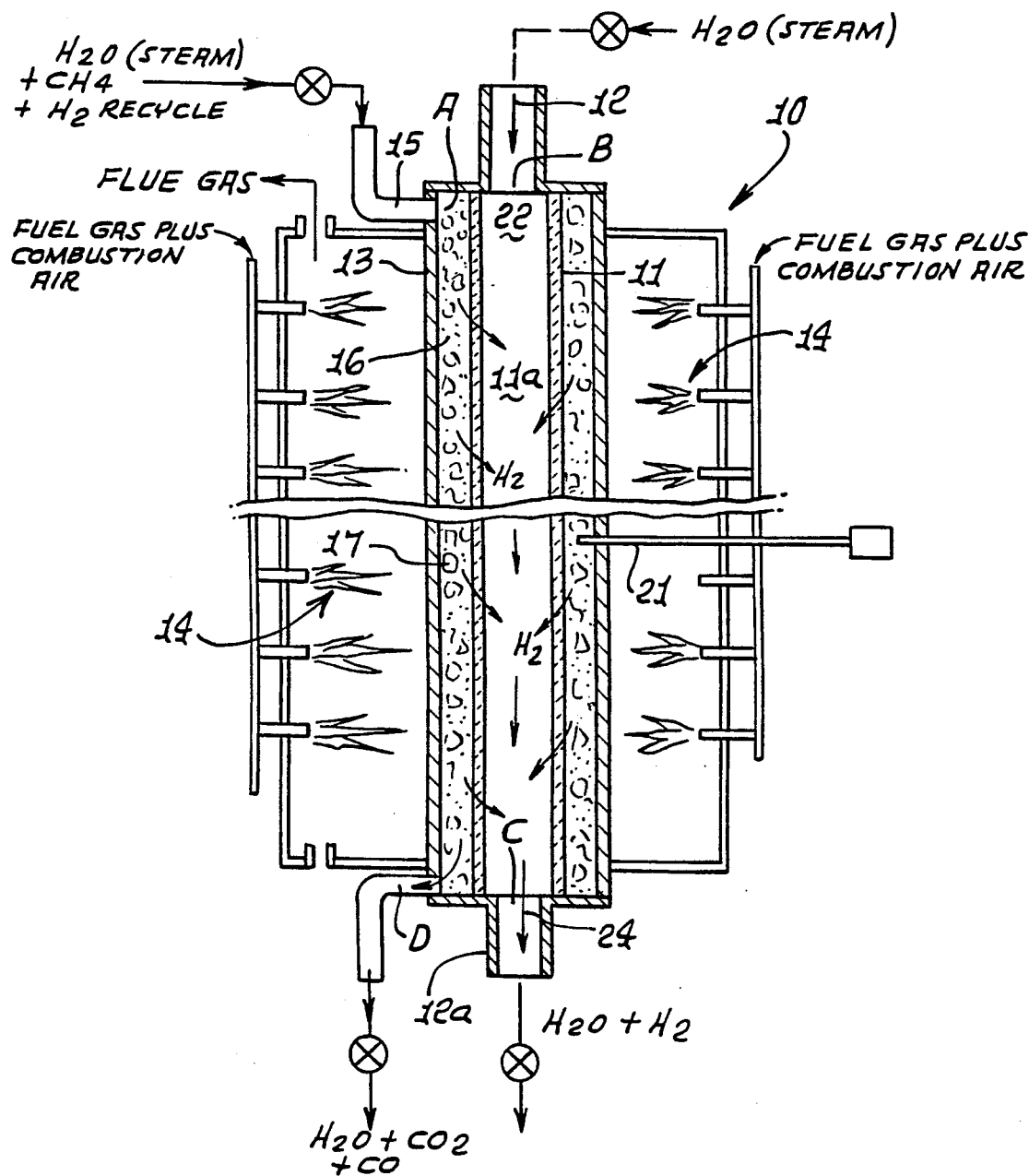

In FIG. 1, a reactor 10 employs a tubular, highly porous asymmetric ceramic membrane 11 treated with a catalytically active substance, such as nickel promoted with alkali metal salts. The membrane reactor is enclosed within a heated metallic tube 13, the whole assembly maintained at 300°-700°, as by gas burners 14.

The preheated reactor feed gas stream containing methane and steam in a 1:3 to 1:5 weight ratio, along with approximately 5 to 10% by volume hydrogen, is introduced through connection 15 at point A into the annulus 16 (which may be filled with pelleted catalyst, as shown) at a pressure ranging from 0.5 to 1,000 psia (or higher). Catalyst 17 (nickel metal promoted with alkali metal salts) is in the form of pellets or rings. Tube 13 containing the catalyst is formed from high alloy material, such as SS304, SS310, SS316, or the like.

The key element in the membrane reformer is the catalytic ceramic membrane tube 11 which has special characteristics as described in:

TABLE 2

| TYPICAL COMPOSITION OF CERAMIC MEMBRANE | | | |
|---|---|---|---|
| | Material | Pore Diameter | Thickness |
| Layer 1 | gamma alumina | 40 Ångstroms | 5 microns |
| Layer 2 | alpha alumina | 0.2 microns | 30 microns |
| Layer 3 | alpha alumina | 0.8 microns | 50 microns |
| Support | alpha alumina | 10-15 microns | 1.5-20 millimeters | where $\gamma$=gamma alumina; $\alpha$=alpha alumina; Å=Ångstroms; $\mu m$=micron; and mm=millimeter The membrane is permeable to hydrogen and less (or not) permeable to methane, carbon oxides and steam. In addition, it is coated on its outside surface with the nickel or other suitable catalytic material. Steam is supplied to the interior of the membrane tube through connection 12 at point B. A pipe connection 12a, provides a conduit for the removal of the reaction products, primarily hydrogen and steam from the inner section of the membrane tube, at point D.

The reacting gas moves down through the reaction zone 16 maintained at temperature by heat flowing through the radiant wall of tube 13 at a rate determined by a temperature sensor 21 controlling the combustion of fuel at burners 14.

As the CH₄ and hydrogen flow moves down through the heated catalyst pellets in the annulus 16, the formation of hydrogen and carbon monoxide occurs. As methane and steam contact the surface of the membrane 11, additional chemical reaction occurs, forming H₂ and CO. Hydrogen preferentially diffuses through the membrane, leaving unconverted methane behind, along with carbon monoxide and carbon dioxide. Steam is supplied to the interior 22 of the membrane, at point B, diluting the hydrogen and inhibiting the diffusion of unreacted CH₄ and steam in the reaction zone 16 through the membrane.

The heat required for the reaction is provided by the combustion of fuel gas in the enclosing furnace. Because of the lower temperatures (300°-700° C.) required for the reactor, the overall efficiency of this system is significantly higher than that for a conventional reformer system, since less fuel is required to be burned to heat the radiant section (tube 13). In a conventional furnace, tubes are required to be heated to temperatures between 750° and 880° C.

Also, the invention permits the use of thinner tube 13 walls for the same feed gas pressure, or higher pressures for the same thickness walls, which results in significant process savings for applications requiring hydrogen-bearing gases at higher pressures, such as production of ammonia, methanol or hydrocracking of hydrocarbons.

The tube 13 itself is typically approximately four inches in external diameter, and is fitted with an internal ceramic membrane 11 from one to one and one-half inches in diameter. The overall length of such a tube is limited by mechanical considerations imposed by a safe and suitable design. For example, current commercial practice makes use of catalyst-filled high alloy tubes four inches in diameter and approximately thirty feet long. Due to the higher efficiency of the system described in this invention, the individual tubes can be shorter, i.e., about eight to fifteen feet in length.

As shown in FIG. 1, $H_2$ that has diffused through the membrane into the stream of steam within the interior 11a of the membrane leaves the latter via connector 24 at point C. A stream of $CO_2$ and $H_2O$ leaves zone 16 at point D Points C and D are spaced lengthwise along the membrane from points A and B, as shown.

Figure 2:
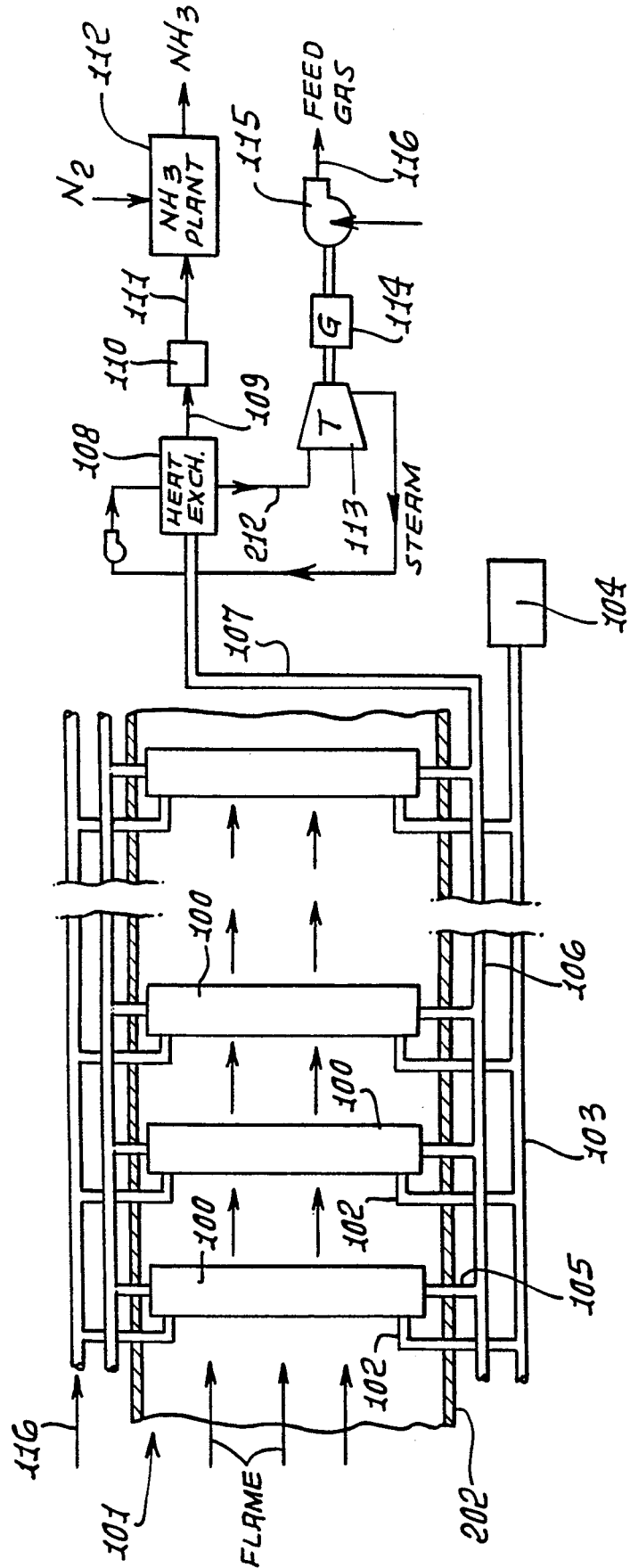

Referring now to FIG. 2, banks 100 of the reactors 10 are shown as located within a furnace 101 equipped with refractory brick walls 102 and fired either from the top, bottom or side depending upon the tubular arrangement, to raise the temperature of the reacting gas mass to 400° to 650° C. The reformed methane is collected through the exit tubes 102 ganged to headers 103 which conduct the high temperature gas to a waste heat recovery system 104 consisting of either a steam generator or a process gas preheater.

The hydrogen-containing stream, exiting from the reactors at 105, is passed via header 106 and duct 107 to heat exchanger 108. Cooled gas at 109 containing less than 5% to 10% methane by volume, is passed through a series of treatment steps at 110 to reduce the carbon dioxide carried within the gas by either adsorption (by molecular sieves or other suitable material) or by absorption utilizing an appropriate chemical solvent In either case, the purified hydrogen is then delivered at 111 to the product use (for example ammonia plant 112) at a high level of purity.

The heat exchanger 108 serve to heat water to produce high pressure steam delivered at 112 to a steam turbine 113. The latter drives a generator 114, which in turn drives a compressor 115, for compressing the feed gas 116 ($CH_4$ and $H_2O$) delivered to the reactors, and at a high enough pressure for continuous conversion into hydrogen, as described, followed by conversion into ammonia. $H_2O$ may be removed from the $H_2$ stream before delivery to the ammonia plant.

In addition to the savings in the tubes, the radiant box efficiency for the present new furnace is significantly higher than the radiant box efficiency for conventional furnaces. This is a direct result of the reduced temperature required to carry out the reforming reaction when using the catalytic ceramic membrane system. By having a maximum outlet temperature of the products of reforming of approximately 650° C., as compared with 850° C., for prior processes, the resultant closer approach of the flue gas temperature to the temperature of the walls in the reaction tubes produces an average radiant efficiency in the range of 65% to 80% for the new system, as compared with 45% to 60% in current practice. This means a material reduction in the quantity of fuel which must be fired simply to provide the sensible heat of the flue gas in order to obtain the necessary temperature for the reaction system.

The overall efficiency of the two furnaces involved is comparable, since this is essentially a function of the heat recovery surface located in the flue gas duct work. The quantity of steam generated by the duct work and exit process systems from the ceramic catalytic system is sufficient to provide the 2.5 to 3.5:1 ratio needed for complete reforming. In addition, because of the accelerated conversion obtained with the new system, the use of a lower quantity of steam is possible, leading to additional potential economic savings.

The present system also results in elimination of the requirement for a shift reactor, wherein carbon monoxide, which has been produced, will be converted into carbon dioxide and additional hydrogen. This is because the carbon monoxide formed as part of the steam reforming reaction remains in contact with steam in the catalytic body in the annulus surrounding the membrane and will be converted into hydrogen and carbon dioxide.

Additional usable feed stocks include methanol, ethanol, ethane, propane, butane, and light petroleum fractions, other hydrocarbons having 1–4 carbon atoms in their chain molecules, and mixtures thereof.

The ceramic tube has the following physical characteristics:
composition: gamma and alpha alumina
porosity: 52–56%
pore volume: 0.4 cc/gram
density: 3.0 g/cc of solid alumina Between 5% and 20% weight percent nickel is typically added to the active surface of the ceramic material.

The process is also effective in the production of methanol and includes the steps:

a) dehydrogenating a first stream of hydrocarbon and steam by diffusion of $H_2$ through a catalytic ceramic membrane at elevated temperature and pressure, b) removing the diffused $H_2$ from the membrane in such a way as to produce an effective methanol synthesis gas with a molar ratio of hydrogen to carbon monoxide in the range of 2.0 to 2.5, c) and converting the synthesis gas to methanol in a catalytic reactor in the absence of a synthesis gas compressor to deliver the synthesis gas to the methanol synthesis plant.

The catalytic ceramic membrane steam/hydrocarbon reformer permits the production of hydrogen in reasonable quantities at significantly lower reaction temperatures than are normally required. This capability can be used to recover thermal energy from exhaust gases from furnaces and from engines such as gas engines and gas turbines to permit significant benefits in overall energy efficiency and to simultaneously reduce the production of undesirable emissions to the atmosphere.

Hot gases exiting the gas engine or turbine typically are passed through a heat recovery train which permits the generation of steam, and the preheat of air cooling the exhaust gas before discharge to the atmosphere. The energy thus recovered can be usefully employed to generate additional power in a combined cycle and improve the overall efficiency of the utilization of the hydrocarbon fuel. In the case of gas turbines, the steam produced can be directly injected into the combustor, and eventually into the gas turbine in the well known ISTIG cycle, which provides for higher power generation and reduced generation of nitrogen oxides.

The combination of the catalytic ceramic membrane steam/hydrocarbon reformer with the ISTIG cycle produces two benefits. The primary one is to convert part of the thermal energy recovered to chemical energy by virtue of the steam/hydrocarbon reforming reaction, i.e.

$$CH_4 + H_2O \rightarrow CO + 3H_2 \tag{1}$$

(2) Heat of Combustion Per Standard Cubic Foot of Gas

100 Btu→330 Btu+990 Btu with the difference of 320 BTU/SCF being supplied from the thermal energy absorbed from the exhaust gas in the temperature range of 600° to 400° C. The chemical energy is then recovered at a high temperature level in the combustor allowing for an incremental increase in the overall energy utilization efficiency as required by the Carnot cycle thermodynamic efficiency analysis. In a typical ISTIG cycle, the recovery of heat as chemical energy can result in 3 to 5% improvement in overall energy utilization as reported in a publication of the California Energy Commission, Chemically Recuperated Gas Turbines, October 1989.

Figure 4:
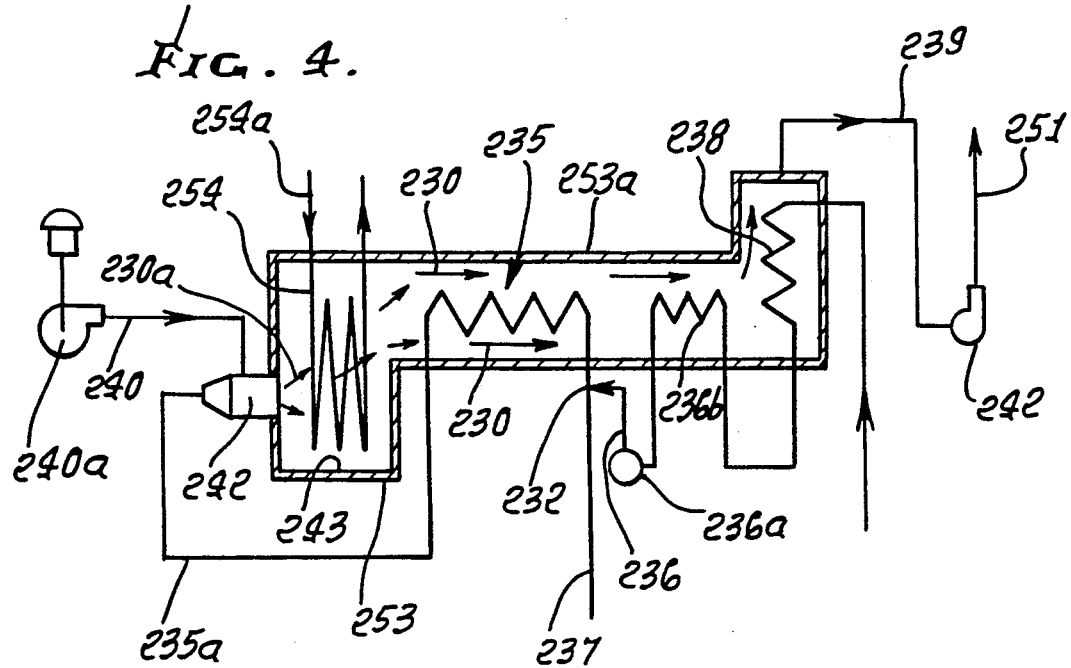

As a separate and independent benefit, the production of nitrogen oxides in the system combustor, and the consequent reduction of nitrogen emission can be achieved by injecting steam into the combustion zone. When using natural gas fuel the limit of steam injection has been observed to be about 2.5 to 2.8 lbs of steam per pound of fuel, when the flame becomes unstable. The normal level is thus set at 2.0 lbs of steam per pound of fuel which results in a $NO_x$ level of 19 to 25 PPM in the exhaust gases. The reforming of the hydrocarbon fuel to produce hydrogen in the fuel mixture improves the combustion characteristics to allow significantly higher steam ratios in the range of 2.8 to 3.5 pounds per pound of fuel without flame stability. This can result in a lowering of the $NO_x$ level to less than 10 ppm permitting environmental requirements to be met without the investment and operating cost of the post combustion ammonia injection followed by catalytic reaction which is the currently used standard. FIG. 4 shows how catalytic ceramic membrane steam/hydrocarbon reformer would be combined with a typical process heater or steam generating furnace.

Figure 3:
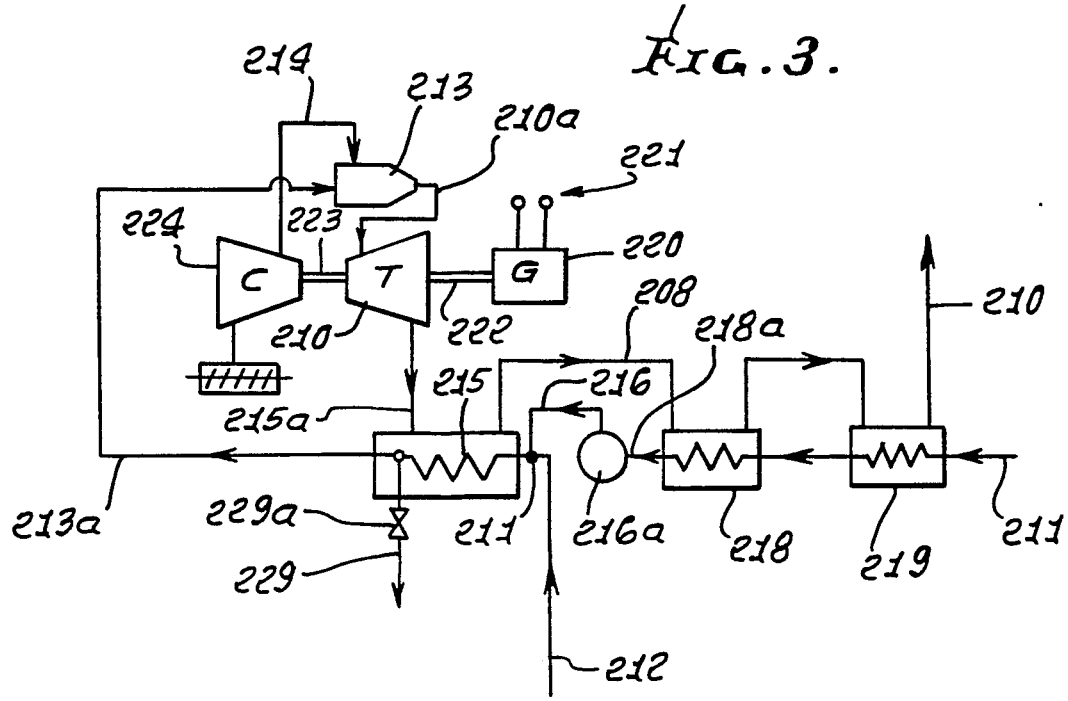

Referring now to FIG. 3, natural gas fuel at 212 enters the system and is mixed at 211 with steam 216, generated in the steam drum 216a. The hydrocarbon/steam mixture passes through the catalytic ceramic membrane steam/hydrocarbon reformer 215, where heat is recovered by supplying the endothermic heat of reaction for the conversion of methane to hydrogen, carbon monoxide and carbon dioxide flowing at 213a. Reformer 215 corresponds to that described above in FIGS. 1 and 2.

The hydrogen rich, mixed fuel flows to the combustor, 213, where it is mixed with pressured air 214, burned with an adiabatic flow temperature below 3,000° F. and passed at 210a into the gas turbine 210 operating in steam injection mode at high pressure and high temperature.

Reduced pressure and reduced temperature products of combustion gas and steam pass at 215a from the turbine exit port to and through the duct side of the catalytic ceramic membrane steam/hydrocarbon reformer 215, giving up heat down to about 850° F. The cooled combustion gas and steam then pass from 215 via line 208 to the shell side of the steam generator 218, where the gas and steam are cooled to about 450° F., giving up heat to generate steam in tubing 218a. The cooled gas and steam then flow to the boiler feed water heater 219 to be cooled to approximately 300° F. stack temperature at 210, while heating boiler feed water supplied at 211. Additional heat can be recovered by providing an air pre-heater to cool the stack gases to a lower temperature, this alternate not being shown.

Turbine 210 is shown driving an electrical generator 220, having power take-off 221. See drive shaft 222. The turbine also drives, via shaft 223, an air compressor 224, which supplies compressed air at 214. Heated water from 218 is fed at 218a to the steam drum 216a.

FIG. 3 also shows removal of a side stream of $H_2$ rich gas at 229, from one or both sides of the membrane 215, as controlled by valve 229a, for other process use.

In FIG. 4, natural gas fuel at 237 is mixed at 232 with steam supplied at 236 from drum 236a, and flows into the catalytic ceramic membrane steam/hydrocarbon reformer 235, of the type described in FIGS. 1 and 2. The reformer recovers heat from the furnace exhaust gas flowing at 230 and produces a fuel mixture of reformed hydrocarbon, hydrogen, carbon monoxide, carbon dioxide and steam, which flows at 235a to the furnace burner 242. The fuel mixture is there mixed with combustion air 240 from the forced draft fan 240a producing a stable flow of hot combustion products in the furnace chamber 243. See arrows 230.

The fuel at 235a because of the presence of hydrogen in the mixture with steam, air and reformed hydrocarbon fuel, will have stable adiabatic flame burning characteristics at temperatures below 3,000° F., thus minimizing the production of thermal $NO_x$ and reducing the concentration of this contaminant to less than 10 ppm in the stack gas 251.

Hot combustion gas flowing at 230a in the furnace chamber 253 gives up heat to the radiant coils 254 which may be used for passing and heating process fluids (supplied at 254a), or for generating steam.

The hot gas then passes at 230 through a duct 253a where heat is recovered in sequence by the catalytic ceramic membrane steam/hydrocarbon reformer 235, by the waste heat steam generator coil 236b, and by the boiler feed water heater 238. The cooled gas is exhausted at 239 to the stack 251, as by the induced draft fan 242.

A schematic diagram of the catalytic ceramic membrane steam/hydrocarbon reformer used in FIGS. 3 and 4 is shown in FIG. 5. See also FIGS. 1 and 2. Multiple tubes or shells 260 of this type are arranged in a supported group or bundle (see FIG. 6) in a hot gas duct 261 surrounded by a gas duct wall or walls as shown at 262 for heat exchange with shells 266, and subsequent outflow at 290 to other heat exchange equipment. The duct 261 receives hot gas at 263 from the combustion systems, as shown in FIGS. 3 and 4. The individual catalytic ceramic membrane tubes 265, each impregnated with catalyst in its membrane wall as referred to above, are supported within stainless steel tubular reactor shells 266 filled with catalyst pellets 267 in the annular space 270 between the tube 265 and the shell 266.

Flow 268 of steam plus hydrocarbon, in the appropriate ratio (2 to 4 moles of steam per mole of hydrocarbon) is introduced into the annular space 270 and heated to reaction temperature (400° to 700° C.) by heat transferred from the hot gas flowing at 263a in the duct 262. The hydrogen resulting from the reforming reaction diffuses through the membrane wall and is carried by the flow of sweep gas (steam at 275) into and through the dip pipe 277 up and out of the reaction zone, at 277a thus shifting the equilibrium composition to favor additional reforming of the hydrocarbon fuel by steam at the relatively low reactor temperature.

Partially reformed hydrocarbon, steam, hydrogen and carbon oxides pass from space 270 through the withdrawal pipe 278 at the bottom of the reactor and conducted at 278a to be combined at 282 with the hydrogen rich gas flow 277a from pipe 277 to produce a mixed fuel at 279 which flows to the combustion systems as described in FIGS. 3 and 4.

See also control valve 293 in line 278a. H$_2$ rich gas may be drawn at 295 from flow 277a, as controlled by valve 296, for other process uses, or combustion systems.

Figure 7:
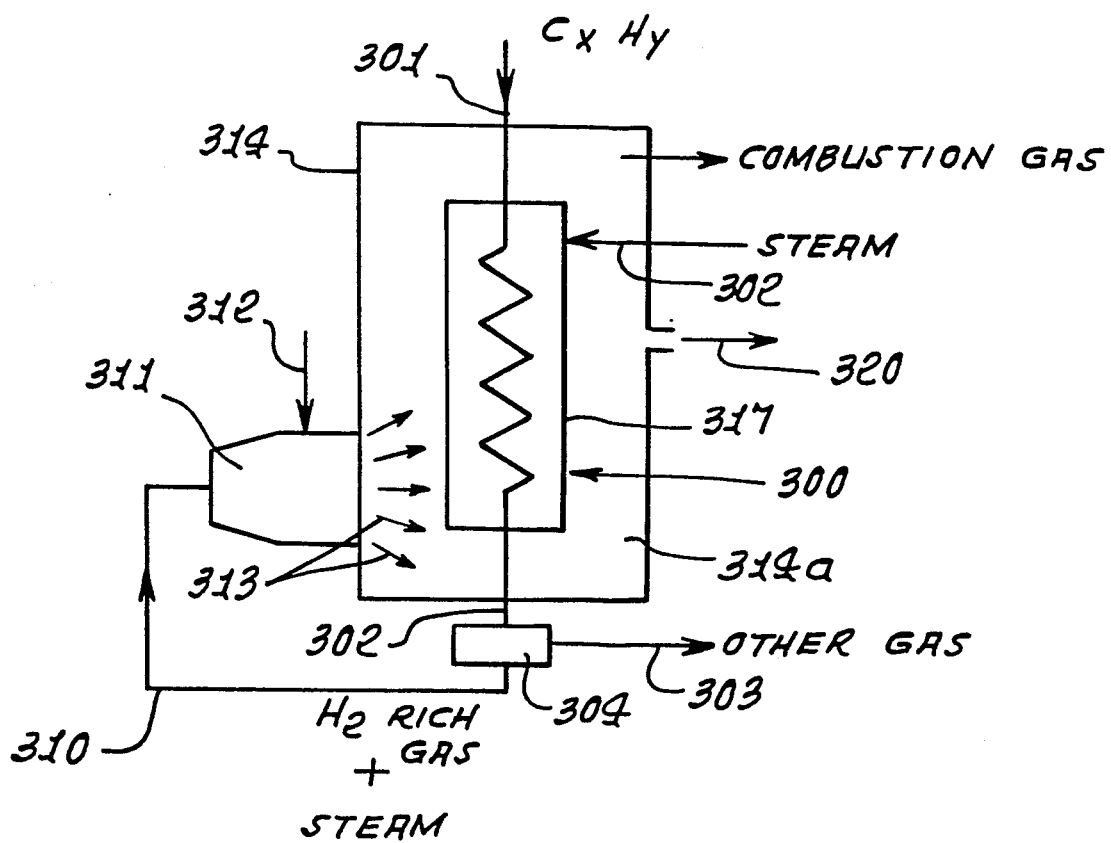

FIG. 7 shows a system that includes a hydrocarbon reformer 300 of a general type that receives a hydrocarbon $C_xH_y$ at 301, and steam at 302 to produce H$_2$ rich gas (which may include CO,CO$_2$, steam, and H$_2$ at 302) and another hydrocarbon gas $C_x$, H$_y$, 303, separated at 304. The H$_2$ rich gas and steam are passed in part as fuel at 310 to burner 211. That fuel is combusted with air supplied at 312, the hot combustion products being discharged at 313 into interior 314a of chamber or duct 314 for transfer of heat to the reformer (as for example via reformer metal wall (317). The combustion gases discharge at 320 from the duct interior 314a.

We claim:

1. The process for steam reforming of a hydrocarbon to produce H$_2$, CO and CO$_2$, that includes:
    a) providing a generally tubular, porous, catalytic ceramic membrane, and providing a heated reaction zone in a container into which said membrane is received,
    b) said membrane carrying a catalytically active metallic substance,
    c) passing a first fluid stream of hydrocarbon and steam into said zone and into contact with one side of said catalytic ceramic membrane, to produce CO$_2$, CO and H$_2$, said first stream including between about 5% and 10% hydrogen and being at pressure between 15 psia and 2,000 psia,
    d) and separately passing a second fluid stream including steam adjacent to said opposite side of said membrane in such manner as to promote hydrogen diffusion through said membrane from said one side to the opposite side thereof, thereby causing more complete conversion of said originally supplied hydrocarbon,
    e) removing hydrogen from said opposite side of said membrane,
    f) maintaining a heated, porous catalytic bed extending lengthwise adjacent said membrane, in said zone, transferring heat into said bed lengthwise thereof and via said container, and passing said first stream into said bed for flow in contact with the bed and heating therein followed by first stream contact said one side of the membrane, said bed including pellets of said catalytically active substance in said zone,
    g) operating a gas turbine or gas engine to produce hot exhaust gases; and transferring heat from said hot gases through said container into said reaction zone, so as to maintain temperatures or temperature at the tube between 300° and 750° C.,
    h) and directing H$_2$ derived from at least one of said sides of the membrane to said gas turbine or gas engine as fuel therefor.

2. The process of claim 1 including removing CO$_2$, CO and H$_2$O from said zone.

3. The process of claim 2 wherein
    i) said first stream containing said hydrocarbon and steam is introduced to said reaction zone at a point A along the length of said catalytic ceramic membrane,
    ii) said second stream containing steam is introduced into a region surrounded by the catalytic ceramic membrane at a point B along the length of said membrane,
    iii) with the produced hydrogen being removed from the region at a point C along the length of said membrane, and
    iv) and the produced CO, CO$_2$ and H$_2$O being removed from said reaction zone at a point D along the length of said membrane.

4. The process of claim 3 including locating said points C and D to be spaced along the length of the membrane from said points A and B.

5. The process of claim 4 including locating said points A and B proximate one end of the tubular membrane.

6. The process of claim 1 wherein said hydrocarbon consists essentially of methane.

7. The process of claim 1 wherein said first stream includes methane and stream in a 1:2 to 1:5 weight ratio.

8. The process of claim 7 wherein said first stream also includes 5% to 10% by volume hydrogen.

9. The process of claim 1 wherein said container consists of a stainless steel tube.

10. The process of claim 1 wherein said hydrocarbon is selected from the group that consists of
methane
methanol
ethane
ethanol
propane
butane
light hydrocarbon having 1–4 carbon atoms in each molecule
light petroleum fractions.

11. The method of claim 1 wherein said second stream is in excess of about 500° C.

12. The process of claim 1 wherein the hydrogen rich gas derived from at least one of said sides of the membrane is delivered at least in part to the combustion fuel inlet of another gas engine, turbine or furnace to improve combustion characteristics and permit lower adiabatic flame temperatures, without instability.

13. In apparatus for steam reforming of a hydrocarbon to produce H$_2$, CO and CO$_2$, the combination that includes:
    a) a generally tubular, porous, ceramic membrane, and first means providing a heated reaction zone in a container into which said membrane is received,
    b) said membrane carrying a catalytically active metallic substance,
    c) second means for passing a hydrocarbon and steam containing first fluid stream into said zone and into contact with one side of said membrane, to produce CO, CO$_2$, and H$_2$,
    d) and third means for separately passing a steam containing second fluid stream adjacent said opposite side of said membrane in such manner as to promote hydrogen diffusion through said membrane from said one side to the opposite side thereof,
    e) fourth means for removing hydrogen and steam from said opposite side of said membrane,
    f) said first means including a heated, porous catalytic bed extending lengthwise adjacent said membrane, in said reaction zone, the container transferring heat into said bed lengthwise thereof, said first fluid stream passing into said bed for flow in contact with the bed and heating therein followed by first stream contact with said one side of the membrane, said bed including pellets of said catalytically active substance in said zone, the container capable of being heated to transfer heat to said pellets, and means for maintaining the temperature at the tube between 300° and 750° C. by said heat transfer and by said steam in said zone, g) and means for using diffused $H_2$ for combustion to provide heat transferred via the container to the membrane.

14. The apparatus of claim 13 including means for recovering heat from combustion exhaust gases and for supplying said heat to said reaction zone.

15. The apparatus of claim 14 including a combustion source for said exhaust gases which comprises one of the following:
gas turbine
internal combustion engine, used for driving one of the following
an electric generator
a gas compressor.

16. The apparatus of claim 15 including means for combining effluents from said one and said opposite sides of the membrane to produce a fuel gas, and means for burning said fuel gas yielding low nitrogen oxide emission by virtue of lower adiabatic flame temperature resulting form the presence of steam in the fuel and the superior combustion characteristics of hydrogen in the fuel gas.

17. The apparatus of claim 16 including means for passing said fuel gas to said combustion source as fuel therefor.

18. The apparatus of claim 16 wherein said means for burning said fuel gas operates at a flame temperature below 3000° F. to minimize nitrogen oxide formation and to reduce nitrogen oxide emission to the atmosphere.

19. The apparatus of claim 18 including a heat exchanger receiving hot products of combustion from said means for burning said fuel gas, and for passing one of the following
steam
process fluid
in heat receiving communication with said hot products of combustion.

20. The apparatus of claim 14 including means to deliver the hydrogen rich gas derived from at least one of said sides of the membrane at least in part to combustion fuel inlets of two or more fuel combusting devices to improve combustion characteristics and permit lower adiabatic flame temperatures without instability.

* * * * *